United States Patent
Mishra et al.

(10) Patent No.: US 6,466,946 B1
(45) Date of Patent: Oct. 15, 2002

(54) COMPUTER IMPLEMENTED SCALABLE, INCREMENTAL AND PARALLEL CLUSTERING BASED ON DIVIDE AND CONQUER

(75) Inventors: Nina Mishra, San Ramon, CA (US); Meichun Hsu, Los Altos Hills, CA (US); Umeshwar Dayal, Saratoga, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 31 days.

(21) Appl. No.: 09/590,030

(22) Filed: Jun. 7, 2000

(51) Int. Cl.[7] .............................................. G06F 17/30
(52) U.S. Cl. ...................................................... 707/102
(58) Field of Search ......................................... 707/102

(56) References Cited

U.S. PATENT DOCUMENTS

| | | | | |
|---|---|---|---|---|
| 5,619,709 A | * | 4/1997 | Caid et al. ................... | 395/794 |
| 5,661,663 A | * | 8/1997 | Scepanovic et al. ......... | 364/490 |
| 5,832,182 A | * | 11/1998 | Zhang et al. ................ | 395/10 |
| 6,067,340 A | * | 5/2000 | Eppstein et al. .............. | 378/4 |
| 6,092,072 A | * | 7/2000 | Guha et al. .................. | 707/101 |
| 6,115,708 A | * | 9/2000 | Fayyad et al. ................. | 707/6 |
| 6,349,309 B1 | * | 2/2002 | Aggarwal et al. ........... | 382/190 |

* cited by examiner

Primary Examiner—Wayne Amsbury

(57) ABSTRACT

A divide and conquer method clusters a set of points to identify at least one centroid. A plurality of "r" subsets of points from the set of points are assigned into "r" partitions. The computer processes the subset of points to generate a plurality of partition centroids, Q, k for each of the r partitions, so as to optimize a clustering metric. The partition centroids are merged into a set of partition centroids, and are stored in main memory of the computer. Thereafter, the partition centroids are processed by accessing the memory to generate a plurality of centroids, c, one for each of the k clusters, so as to optimize a clustering metric. Data incremental and feature incremental divide and conquer techniques are disclosed. Furthermore, the divide and conquer technique has application for implementation in parallel processing computer systems.

18 Claims, 7 Drawing Sheets

COMPUTER IMPLEMENTED SCALABLE, INCREMENTAL AND PARALLEL CLUSTERING BASED ON DIVIDE AND CONQUER

BACKGROUND OF THE INVENTION

1. Field of the Invention

The present invention is directed toward the field of computer implemented clustering techniques, and more particularly toward methods and apparatus for divide and conquer clustering.

2. Art Background

In general, clustering is the problem of grouping objects into categories such that members of the category are similar in some interesting way. Literature in the field of clustering spans numerous application areas, including data mining, data compression, pattern recognition, and machine learning. The computational complexity of the clustering problem is very well understood. The general problem is known to be NP hard.

The analysis of the clustering problem in the prior art has largely focused on the accuracy of the clustering results. For example, there exist methods that compute a clustering with maximum diameter at most twice as large as the maximum diameter of the optimum clustering. Although these prior art clustering techniques generate close to optimum results, they are not tuned for implementation in a computer, particularly when the dataset for clustering is large. Accordingly, it is desirable to develop a clustering technique that maximizes the computer implementation efficiency even at the cost of clustering results.

In general, prior art clustering methods are not designed to work with massively large and dynamic datasets. Most computer implemented clustering methods require multiple passes through the entire dataset. Thus, if the dataset is too large to fit in a computer's main memory, the computer must repeatedly swap the dataset in and out of main memory (i.e., the computer must repeatedly access an external data source, such as a hard disk drive). The analysis of the clustering problem in the prior art has largely focused on its computational complexity, and not its input/output complexity. However, in implementing the method in a computer, there is a significant difference in access time between accessing internal main memory and accessing external memory, such as a hard disk drive. For example, loading a register requires approximately $10^{-9}$ seconds while accessing data from the disk requires roughly $10^{-3}$ seconds. Thus, there is about a factor of a million difference in the access time of internal vs. external memory. As a result, the performance bottleneck of clustering techniques that operate on massively large datasets is often due to the I/O communication and not the processing time (i.e., the CPU time). This impact of I/O communications is compounded by the fact that processor speed are increasing at an annual rate of approximately 40 to 60 percent, compared to the increase of approximately 7 to 10 percent for disk transfer rates.

The I/O efficiency of clustering methods under different definitions of clustering has been studied. Some approaches are based on representing the dataset in a compressed fashion based on how important a point is from a clustering perspective. For example, one prior art technique stores those points most important in main memory, compresses those that are less important, and discards the remaining points. Another common prior art technique to handle large datasets is sampling. For example, one technique illustrates how large a sample is needed to ensure that, with high probability, the sample contains at least a certain fraction of points from each cluster. The sampling approach applies a clustering technique to the sample points only. Moreover, generally speaking, these prior art approaches do not make guarantees regarding the quality of the clustering. Accordingly, it is desirable to develop a clustering technique with quality of clustering guarantees that operates on massively large datasets for efficient implementation in a computer.

SUMMARY OF THE INVENTION

A divide and conquer method significantly improves input/output (I/O) efficiency in a computer. The divide and conquer method clusters a set of points, S, to identify K centroids. The set of points, S, are assigned into "r" partitions, so as to uniquely assign each point into one partition. At least one of the subsets of points for a partition are stored into main memory of the computer. The computer processes the subset of points to generate a plurality of partition or divide centroids, Q, k for each of the r partitions. The divide centroids are merged into a set of partition centroids, and are stored in main memory of the computer. Thereafter, the partition centroids are processed by accessing the memory to generate a plurality of conquer centroids, $c_1, \ldots, c_k$. The divide and conquer method is a data incremental as well as a feature incremental method. Also, the divide and conquer method permits parallel processing for implementation in a multi-processor computer system.

DETAILED DESCRIPTION

Figure 1:
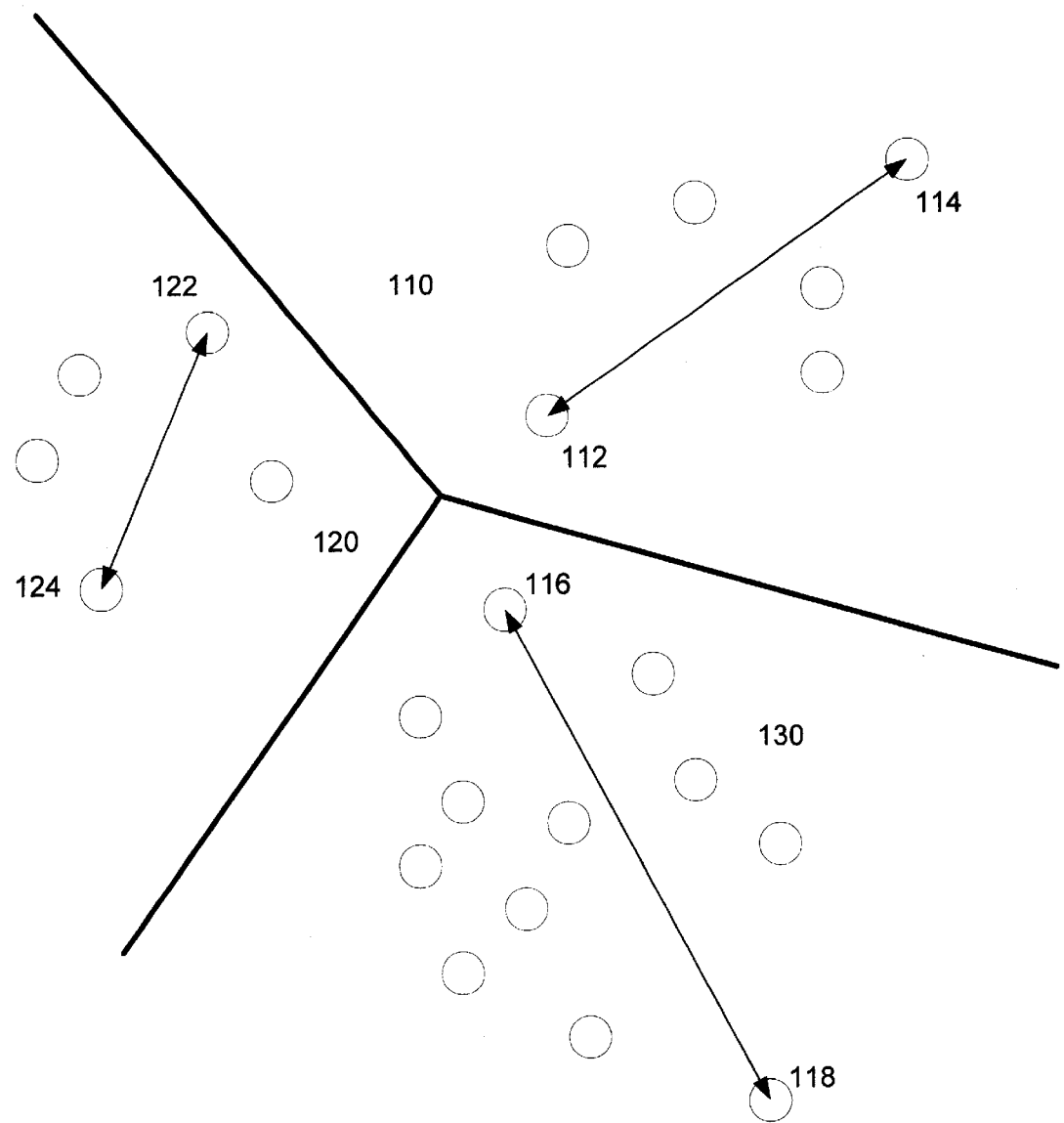
FIG. 1 illustrates the "maximum diameter" between points for three example clusters.

Clustering Overview:

In general, clustering, as used herein, is a process to operate on a set of points, S, and a number, "k", to compute a partitioning of S into k partition such that some clustering metric is optimized. Some examples of clustering metrics include minimizing the maximum diameter, minimizing the maximum radius, and minimizing the sum of radii.

The divide and conquer technique of the present invention has application for use in knowledge discovery and data mining. These applications require a clustering technique with quality and performance guarantees. The knowledge discovery and data mining applications require manipulation of datasets that are massively large and dynamic in nature. Due to the large dataset, computer implemented clustering requires significant computer resources. As described fully below, the divide and conquer technique of the present invention significantly improves the efficiency of computer resources, including reducing input/output (I/O) operations and permitting execution of parallel methods.

The clustering, as it relates to the use of computer resources, may generally be described as follows: X defines a set of features; $E^x$ denotes Euclidean space over the features, X; and S represents a subset of points in $E^x$. If M is the size of memory in the computer, then one issue to maximize the computer implementation of clustering is to ascertain the best way to cluster S, o using any clustering technique, when $|S|>>M$.

The divide and conquer method of the present invention provides solutions: to reduce access to external memory, to permit incremental clustering; and to permit parallel clustering. In general, the divide and conquer method reduces a large problem (i.e., clustering large datasets) to many small or "sub-problems" for independent solution. In one embodiment, the "sub problems" are divided to a size small enough to fit in main memory of the computer. Also, these small or sub-problems are computed incrementally. Furthermore, these sub-problems may be distributed across multiple processors for parallel processing.

In one embodiment, the divide and conquer technique of the present invention generates a clustering with maximum diameter within four of the optimum. A prior art farthest point ("FP") clustering approach generates a clustering with maximum diameter within two of the optimum, but requires "k" scans of the dataset. In contrast, the divide and conquer technique requires only one scan of the input dataset. Thus, the gain in I/O efficiency in the divide and conquer technique comes with a quantifiable loss of clustering quality.

In general, a definition for "clustering", including the definition for "maximum diameter", follows. Let S define a set of n points over the features X, such that $S \subset E^x$. Using this nomenclature, a cluster is a subset of S. Also, let dist define the distance measurement that satisfies the triangle inequality, $\forall p,q,r \in E, \text{dist}(p,q)+\text{dist}(q,r) \leq \text{dist}(p,r)$. For example, any of the $L_q$ distance metrics satisfy the triangle inequality. Also, the diameter of any single set of points, S, is defined as the largest distance between any pair of points in S, such that $\text{diam}(S)=\max_{s,s' \in S}\text{dist}(s,s')$. Furthermore, the diameter of a collection of sets $S_1, \ldots, S_k \subseteq E^d$ is defined as the largest diameter of any individual set, such that $\text{diameter}(S_1, \ldots, S_k)=\max_{1 \leq l \leq k} \text{diam}(S_l)$. Also, a "clustering" of S comprises any partitioning of S, and a k-clustering of S is any partitioning of S into k (disjoint) clusters.

Using the above defined nomenclature, for any given collection S of n points and a natural number, k, the optimum diameter OPT-diam(S,k), is the minimum maximum diameter over all k-clusterings of S. Specifically, this relationship may be expressed as:

OPT–diam$(S,k)$=min{diamater$(C_1, \ldots C_k):C_1, \ldots C_k$ is a partition of S}

Note that there may be multiple clusterings that realize the optimum diameter.

Given a set of points $S \subset E^x$, a natural number k, one definition of clustering involves identifying a clustering $C_1, \ldots, C_k$ of S such that diameter$(C_1, \ldots, C_k)$=OPT-diam(S, k).

In the literature of clustering, this problem is commonly referred to as the k-center problem. The k-center problem is to find a clustering that minimizes the maximum radius. An algorithm that minimizes the maximum radius also minimizes the maximum diameter, and vice versa.

This clustering problem is NP-hard. The best polynomial-time method generates a clustering $C_1, \ldots, C_k$ such that the maximum diameter of $C_1, \ldots, C_k$ is at most twice OPTdiam(s,k) (i.e., the algorithm finds a 2-approximation).

In one embodiment, the divide and conquer technique identifies a clustering that minimizes the maximum distance between any two points in a cluster. FIG. 1 illustrates the diameter, or the "maximum distance" between points for three example clusters (e.g., clusters 110, 120 and 130). For this example, points 122 and 124 in cluster 120 define a diameter. For cluster 110, points 112 and 114 define a diameter. Similarly, points 116 and 118 define a diameter.

In one embodiment, the divide and conquer technique of the present invention utilizes, in part, a farthest point ("FP") method. Although the present invention is described in conjunction with the farthest point method, any clustering technique may be applied to the divide and conquer techniques described herein. The input to the FP method is a set, S, of n points and a number, k, of clusters for which to partition the set. An arbitrary point $c_0 \in S$ is selected as the first "centroid." The point $c_0 \in S$ farthest from $c_0$ is selected as the next centroid. The FP technique repeats the following two steps until it has found k centroids (i.e., one centroid is found in each iteration):

1) The data is partitioned according to the centroids as follows:

$C_j=\{s \in S: s$ is closer to $c_j$ than any other centroid $c_k (j \neq k)\}$ 2) A new centroid is computed. The new centroid is the point in partition $C_j$ farthest from its centroid, $c_j$.

The resultant centroids are denoted by $FP_s(k,c_0)$, that result from running FP on input S and k, assuming $c_0 \in S$ was the first centroid selected by FP. The base FP method has time complexity O(nk). Since there are k iterations of the two steps above, each iteration requires O(n) computations to repartition the data and compute a new centroid. The FP method has the added desirable property that the maximum diameter of any cluster is at most twice as large as the diameter of the optimum clustering.

In other embodiments, the divide and conquer technique may use other clustering algorithms. For example, other clustering algorithms exist for the k-center problem. The divide and conquer technique may be applied to any clustering algorithm that outputs k centers. These algorithms may output k centroids that optimize a metric different from k center. For example, an algorithm that minimizes the sum of distances among all pairs of points in a cluster may be utilized by the divide and conquer technique. However, the quality guarantee regarding the clustering is not known to apply to other metrics.

Divide And Conquer Implementation Efficiencies:

In general, most computer implemented clustering methods require multiple passes through the entire dataset. Thus, if the dataset is too large to fit in a computer's main memory, the computer must repeatedly swap the dataset in and out of main memory (i.e., the computer must repeatedly access an external data source, such as a hard disk drive). In general, a method that manages placement or movement of data is called an external memory method (i.e., also referred to as I/O efficiency and out-of-core method). The I/O efficiency of an external memory method is measured by the number of I/O accesses it performs. Also, I/O efficiency of an external memory method is measured by the number of times the input dataset is scanned.

The divide and conquer technique of the present invention provides guarantees about the quality of the cluster it generates, and therefore quantifiable statements about the overall clustering approach are justifiable. Accordingly, an exact characterization regarding the loss of quality that the divide and conquer approach incurs due to the gain of I/O efficiency is provided. Specifically, in one embodiment, whereas the prior art external memory method requires "k" scans of the dataset to compute a 2-appoximation, the divide and conquer technique requires only one scan of the input dataset to identify a 4-approximation. Another prior art method in one scan of the input dataset computes a worse approximation (8 as opposed to 4) in less space.

As used herein, a method is incremental if, given a sequence of sets of points $P_1, P_2, \ldots, P_r (P_i \subset E^x)$, it outputs a solution after processing each $P_i$ in time polynomial in $i, k, |P_i|$. Note that as i increases, the method is allowed more time to produce its next output. Further, while it is allowed time to process $P_i$, it is not permitted time to process any of the previous subsets $P_j$ for j<i.

$D_1, \ldots, D_m$ is defined as the clustering produced after processing $P_1, \ldots, P_m$, respectively (i.e., each $D_i$ is a k-clustering of $P_1 \cup \ldots \cup P_i$). For purposes of nomenclature, a performance ratio of an incremental clustering process is defined as the largest ratio of the diameter of $D_i$ to the optimum k-clustering diameter of $P_1 \cup \ldots \cup P_i$ at any increment i. This may be expressed as:

$$\max_i \frac{\text{diameter}(D_i)}{OPT - \text{diam}(P_1 \cup \ldots \cup P_i, k)}$$

With the divide and conquer technique of the present invention, the result has a performance ratio of 4. Another prior art method finds a worse approximation (8 as opposed to 4) in less space. The divide and conquer methods are not sensitive to the order of the input data. In some incremental methods, if the subset $P_i$ is processed before $P_j$, the clustering performance is significantly worse than if $P_j$ preceded $P_i$.

When clustering dynamic datasets, the clustering technique must consider that the set of features identified in the clustering may change over time. Standard incremental models assume that the points for clustering originate from the same set of features. For example, in the text document clustering problem, one application is to cluster text document collections that change over time (e.g., documents accessible on the world wide web). To apply numerical clustering techniques to text documents, each document is assigned a vector representation. For example, to generate the vector representation, words in the document are selected as features and the frequency or occurrence of the words as weights. Since these text document collections incrementally change over time, an important issue in clustering is to determine how to incrementally change the clusters. For example, one way that document collections may change is that new documents may be added to the collection over time. Another example of how document collections may change over time is that words or phrases in new documents may not have appeared in old documents in the collection. For this example, the vector representation of these new documents may be relative to a completely different set of features. The divide and conquer method of the present invention incorporates an incremental data model for use in feature incremental applications.

The following definition accommodates a feature incremental method (i.e., the set of features may change over time). If $X_1, \ldots, X_r$ is a set of features and $E^{x_i}$ denotes Euclidean space over the set of features, $X_i$, for i=1, ..., r. Also, define $D_1, \ldots, D_r$ as the k-clustering produced after $P_1 \ldots P_r$, respectively. Note that the clustering Di is over the set of features $X_1 \cup \ldots \cup X_r$. Further, define $T_i = \cup_{j=1, \ldots, i} P_{j,i}$ where Pj,i is the set of points in Pj extended to the set of features $X_1 \cup \ldots \cup X_r$ (i.e., the set of points in Pj,i contain zeros in all the positions in $\{X_1 \cup \ldots \cup X_r\} - X_j$. There is an assumption that no feature is ever removed. Accordingly, the performance ratio of the feature incremental clustering is defined as follows:

$$\max_i \frac{\text{diameter}(D_i)}{OPT - \text{diam}(T_i, k)}$$

The result of this feature incremental clustering method yields a performance ratio of four.

Figure 2:
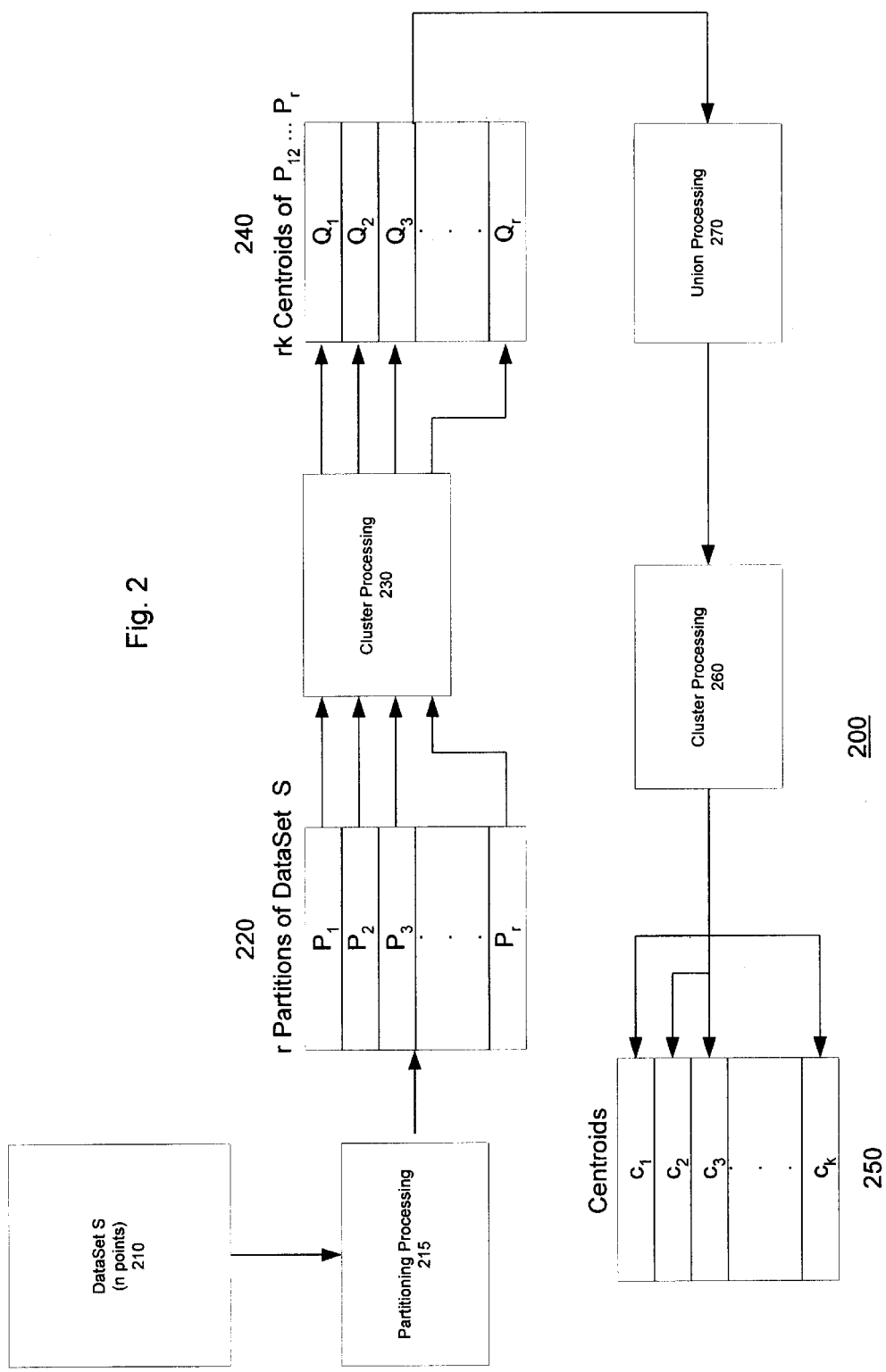
FIG. 2 is a block diagram illustrating one embodiment for divide and conquer processing of the present invention.

Divide and Conquer Embodiments:

The divide and conquer method receives, as input, a set, S, of n points and k number of clusters, and generates, as an output, a plurality of centroids of S (i.e., $c_1 \ldots c_k$). The divide and conquer technique, utilizing a clustering algorithm, A, may be expressed as follows:

$(P_1, \ldots, P_r)$=arbitrary partition of S into r (disjoint) subsets;

For i=1 to r
 $Q_i = A(P_i, k)$
End For $\{(c_1, \ldots, c_k)\} = A(Q_1 \cup \ldots \cup Q_r, k)$
Output $\{c_1, \ldots, c_k\}$ FIG. 2 is a block diagram illustrating one embodiment for divide and conquer processing of the present invention. A divide and conquer system 200 receives the dataset S and k number of clusters (block 210) for input to partition processing 215. The partitioning processing 215 arbitrarily partitions dataset S into "r" partitions. The "r" partitions are shown in block 220 of FIG. 2. The "r" partitions are input to cluster processing 230. As described above, in one embodiment for cluster processing, the farthest point method can be applied to each of the "r" partitions $P_i$. With an input $(P_i, k)$, the cluster processing 230 yields the result $Q_i = A(P_i, k)$. The r sets of k centroids, $Q_i$, are illustrated in FIG. 2 as block 240. The rk centroids $Q_1, \ldots, Q_r$ 240 are input to union processing 270. The union processing 270 merges the centroid results (i.e., rk centroids) by executing the operation $(Q_1 \cup \ldots \cup Q_r)$. A cluster processing 260 calculates centroids from the output of union processing 270. The k centroids generated from the cluster processing operation 260 are labeled in FIG. 2 as block 250.

Figure 3:
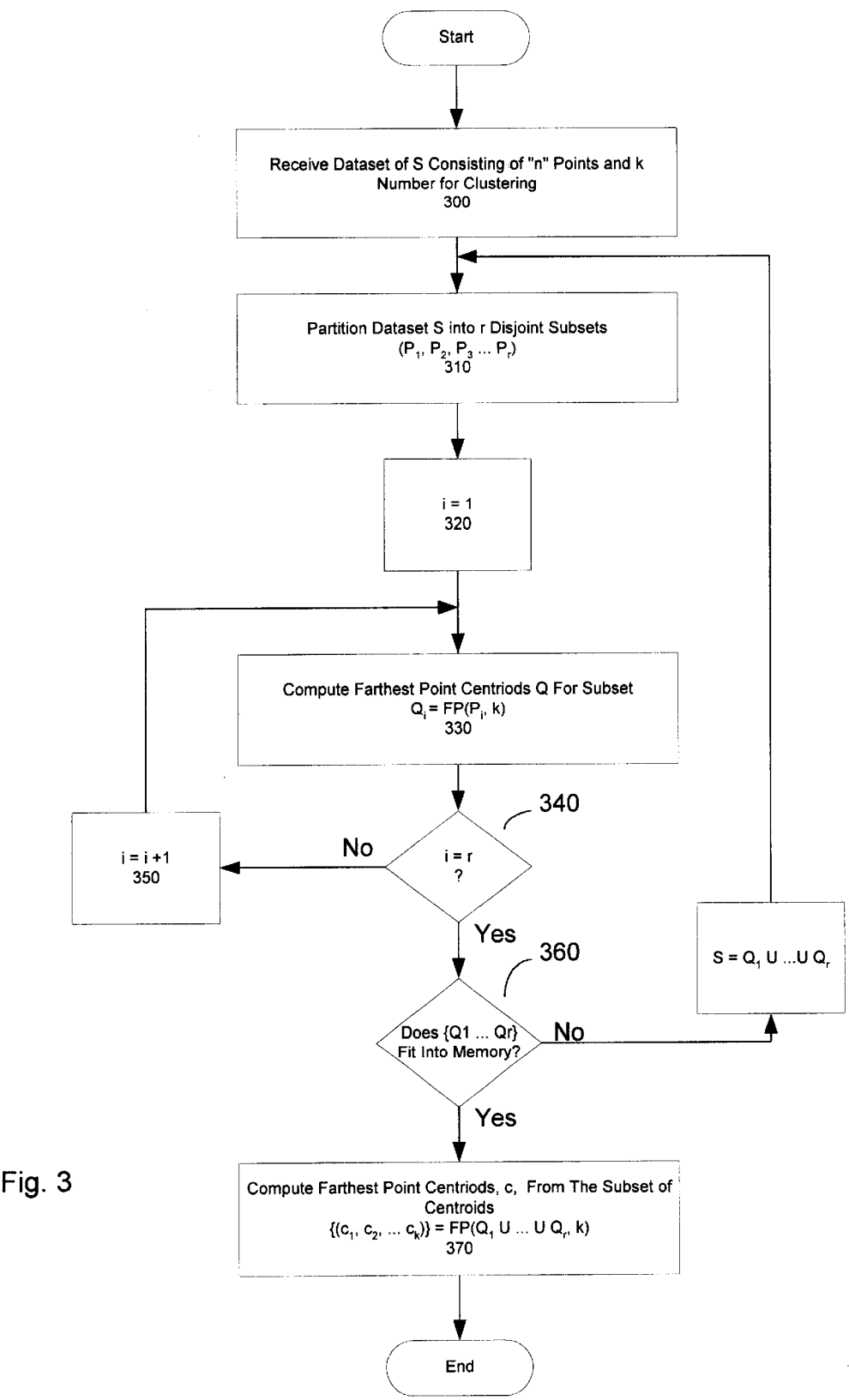
FIG. 3 is a flow diagram illustrating one embodiment for the divide and conquer technique of the present invention.

FIG. 3 is a flow diagram illustrating one embodiment for the divide and conquer technique of the present invention. The dataset consisting of "n" points and "k" number of clusters are received (block 300, FIG. 3). The dataset S is partitioned into "r" disjoint subsets to form "r" partitions $(P_1, P_2, \ldots P_r)$ (block 310, FIG. 3). An iterative process to calculate the farthest point for each partition is executed. Specifically, the variable, i, is set to 1, and centroids are calculated for the corresponding partition (blocks 320 and 330, FIG. 3). Similarly, for each i, a corresponding plurality of centroids, $Q_i$, are calculated until all of the "r" centroids, one for each partition, have been calculated (blocks 330, 340, and 350, FIG. 3).

If the divide centroids fit into internal memory of the computer, then the farthest point is calculated from the subset centroids in accordance with the expression $\{(c1, c2, \ldots ck)\} = FP(Q_1 \cup \ldots \cup Q_r, k)$ (blocks 360 and 370, FIG. 3). Alternatively, if the r centroids do not fit in internal memory of the computer, then the divide and conquer method is recursively applied to $((Q_1 \cup \ldots \cup Q_r, k)$.

Figure 4:
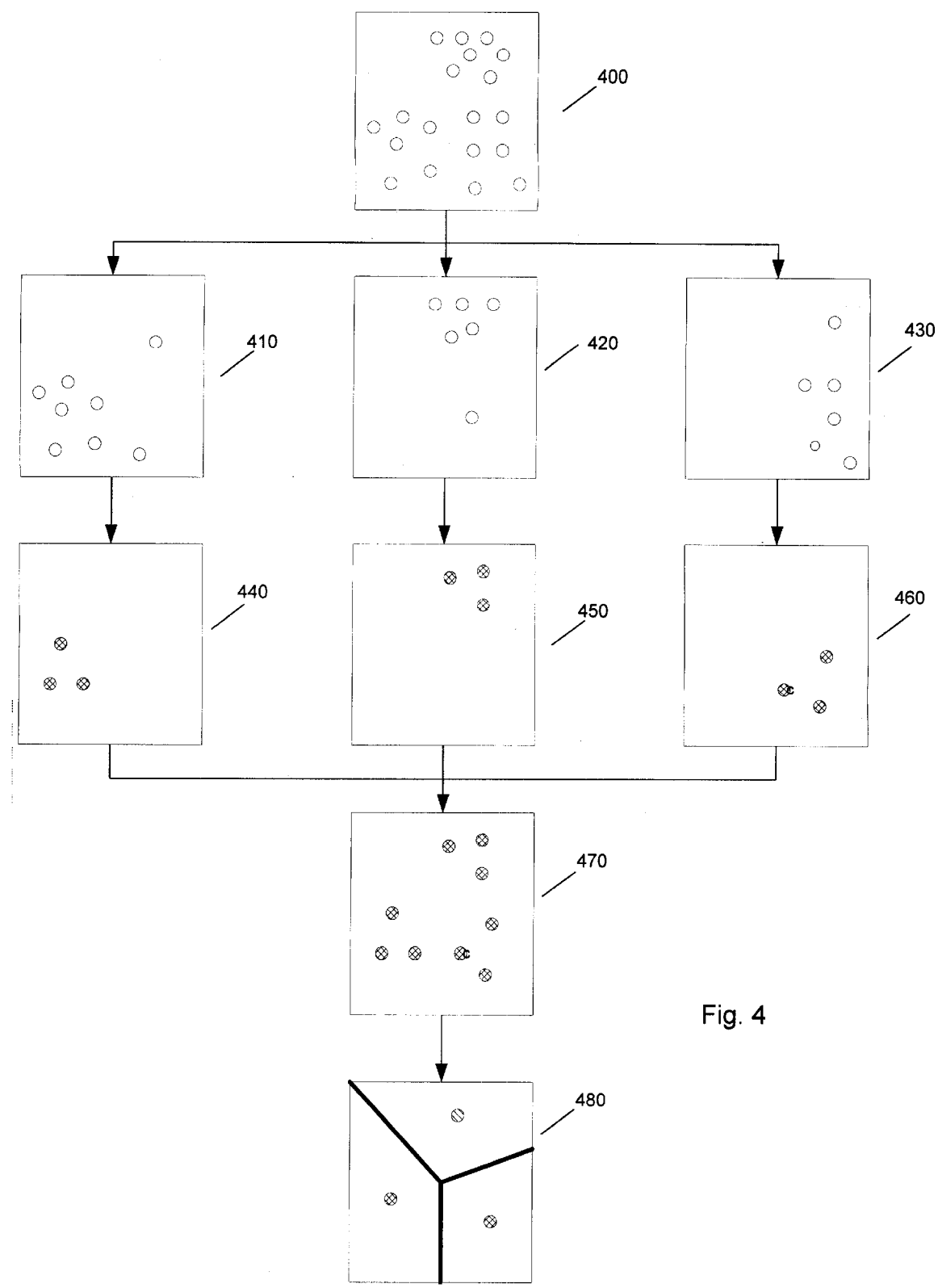
FIG. 4 illustrates an example for one embodiment of the divide and conquer technique.

FIG. 4 illustrates an example for one embodiment of the divide and conquer technique. The dataset, represented by the dots, is clustered into three clusters based on the criteria to minimize the maximum diameter among points in the dataset. In order to cluster the dataset into those clusters, the dataset is first arbitrarily partitioned. For this example, the dataset is divided into three partitions. A first partition includes those points shown in block 410; a second partition includes those points shown in block 420; and a third partition includes those points shown in block 430. A farthest point calculation is executed on each block of points (e.g., blocks 410, 420 and 430). The result yields centroids for each corresponding partition (e.g., three centroids in block 440 corresponding to partition 410, three centroids in block 450 corresponding to partition 420, and three centroids in block 460 corresponding to partition 430). The three centroids (blocks 440, 450 and 460) are combined in a union operation to generate the centroids set of block 470. A calculation of farthest point for the set of centroids in block 470 yields three centroids as shown in block 480. The three centroids generate the boundaries for the three clusters identified for the dataset. The boundaries for the clusters are shown in bold in block 480.

The run time for a computer implemented divide and conquer method is described. For each partition, $P_i$, the divide step requires time $O(|P_1| \cdot k)$. Since there are rk centroids in the conquer step, the conquer step requires time $O(rk^2)$. Assuming the divide centroids fit into memory, the total run-time is thus $O(nk+rk^2)$.

Figure 5:
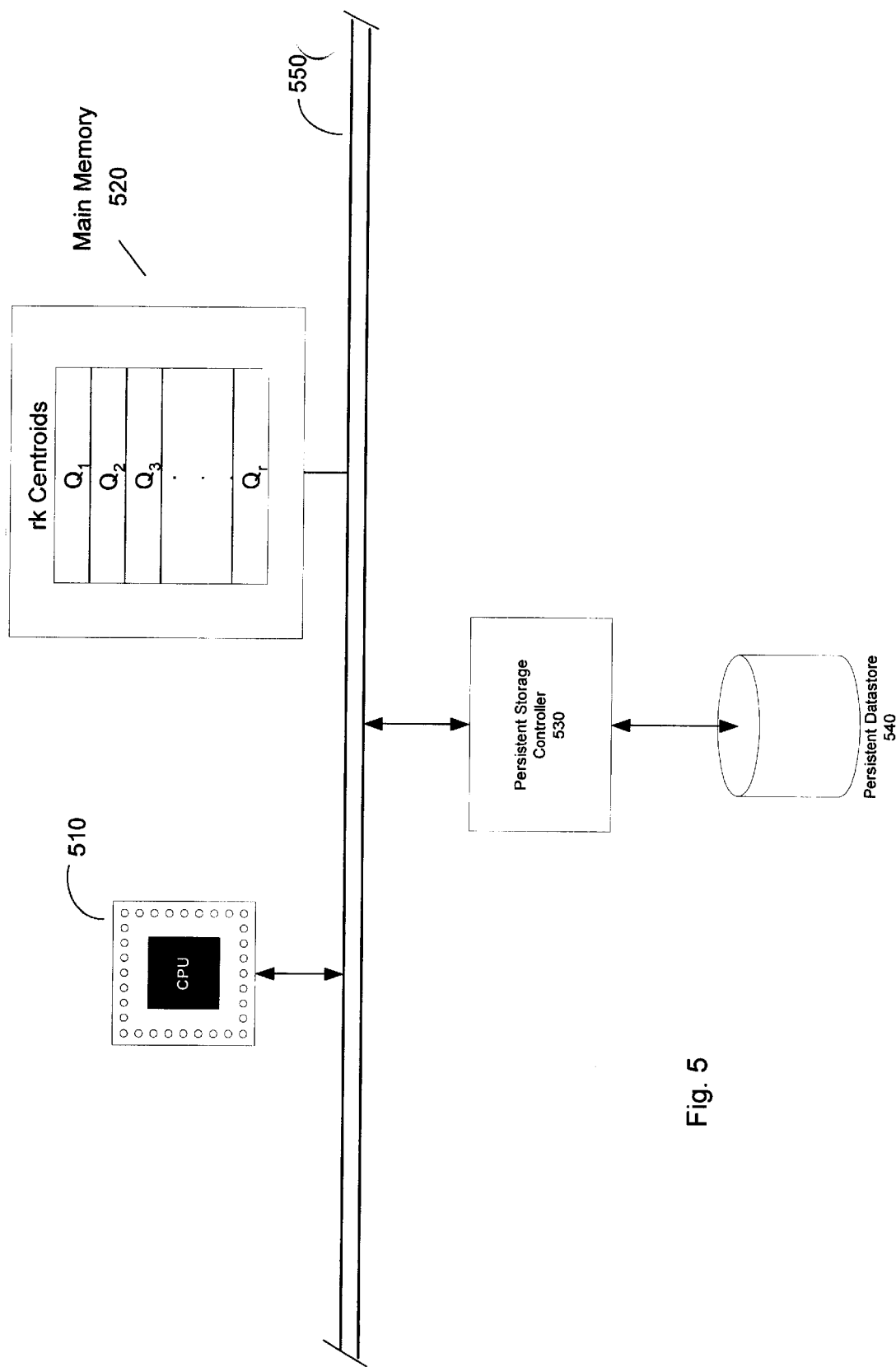
FIG. 5 is a block diagram illustrating one embodiment for implementing the divide and conquer technique in a computer system.

Computer Implementation Efficiency:

FIG. 5 is a block diagram illustrating one embodiment for implementing the divide and conquer technique in a computer system. As shown in FIG. 5, the computer includes a central processing unit ("CPU") 510 and main memory 520. In general, the divide and conquer technique is implemented with a plurality of software instructions. The CPU 510 executes the software instructions to identify the clusters. As described above, the divide and conquer technique has application for processing massively large datasets. Initially, the datasets may reside in a persistent data store, such as data store 540. The persistent data store 540 may comprise any type of storage device capable of storing large amounts of data, such as a hard disk drive. A shown in FIG. 5, data is transferred on a bus 550. The bus 550 couples main memory 520 and persistent data store 540, through persistent storage controller 530, to CPU 510. Although FIG. 5 illustrates a single bus to transport data, one or more busses may be used to transport data among the CPU 510, main memory 520 and persistent data store 540 without deviating from the spirit and scope of the invention.

To process a massively large dataset using a prior art clustering technique, the program either swaps data in and out of main memory 520 and/or the program executes numerous input/output operations to the persistent data store 540. The divide and conquer method of the present invention improves I/O efficiency because a very large dataset, initially stored in the persistent data store 540, is divided into smaller subsets of data that are stored in main memory 520. The clustering algorithm calculation may be executed on these subsets without any data swapping to the persistent data store 540.

As described above, the divide and conquer technique requires only one scan of the dataset, whereas the prior art FP technique requires k scans of the dataset. For purposes of nomenclature, M is defined as the size of memory in bytes, N is defined as the size of the problem in bytes, B is defined as the size of a block scan, and t is defined as the size of each point. When operating on massively large datasets, it is assumed that |S| is much larger than the size of main memory 520 (i.e., N>>M). Also, it is assumed that k centroids can reside in main memory 520 (i.e., kt<M).

In one embodiment for a computer implemented divide and conquer method, the points of dataset S are divided into subsets, $P_i$, such that each subset may be stored in main memory 520. Thus, the total number of subsets r is assumed to be $$\frac{N}{M}.$$

The entire dataset need only be scanned once to read in each partition $P_i$ of S. Thus, the total number of I/O operations required to read $P_1 \cup \ldots \cup P_r$ is $$\frac{N}{B}.$$

After each run of $FP(P_i,k)$, $$\frac{kt}{B}$$

I/O operations are needed to write the result of each clustering. For the conquer step, rk centroids from the union operation $Q_1 \cup \ldots \cup Q_r$ must be clustered. If the r centroids fit into main memory as in 520 of FIG. 5 (i.e., if rkt<M), then $$\frac{rkt}{B}$$

I/O operations are required for reading into main memory 520. Also, $$\frac{kt}{B}$$

I/O operations are required to write out the k centroids, and $N/B$ I/O operations are required to partition the dataset according to the final conquer centroids. Thus, in total, $$\frac{2N + (r+2)kt}{B}$$

I/O operations are required if rk<M.

If the r centroids do not fit into main memory (i.e., if rkt>M), then the divide and conquer may be applied recursively on $(Q_1 \cup \ldots \cup Q_r, k)$. For each ith successive recursive application, the problem size $N_t$ decreases by a factor of M, i.e., $N_t = N/M^i kt$. Thus, the number of I/O operations is $$\frac{1}{B}\sum_{i=0}^{J}\left[2\left(\frac{N}{M^i}\right) + \left(\frac{N}{M^{i+1}} + 2\right)kt\right], \quad \text{where} \quad j \geq \frac{\log Nkt}{\log M}.$$

The divide and conquer method may be executed in a computer using only main memory (i.e., swapping to the persistent data store 540 is not required). Each partition, $P_i$, may cluster a problem of size $\leq M$ and still fit in main memory 520. Accordingly, the divide and conquer method may solve a problem of size $$\frac{M^{i+1}}{kt}$$

in i recursive applications of divide and conquer.

The divide and conquer method of the present invention has application as an incremental method. For this application, a collection of points, $P_i$, are input to each increment, and the divide and conquer technique computes a k-clustering of $P_1 \cup \ldots \cup P_i$, using the clustering results of $P_1 \cup \ldots \cup P_{i-1}$. If a result of $A_{P_j}(k)$ for each previous increment of $j=1, \ldots, i-1$, then a k-clustering of $P_1 \cup \ldots P_i$ may be obtained by first clustering $P_i$, and then clustering all the centroids (i.e., by first computing $A_{P_i}(k)$ and then computing $A_{A_{P_1} \cup \ldots \cup A_{P_i}}(k)$). Thus, the divide and conquer technique runs in time polynomial in $|P_i|$, i and k. If $D_i$ is a set of clusters produced after increment $P_i$, then the diameter ($D_i$) may be expressed as diameter($D_i$)$\leq 4 \cdot$OPT$-$diam($P_1 \cup \ldots \cup P_i$,k). Accordingly, the performance ratio, max, $$\frac{\text{diameter}(D_i)}{OPT - \text{diam}(P_1 \cup \ldots \cup P_i, k)},$$

is at most 4.

Figure 6:
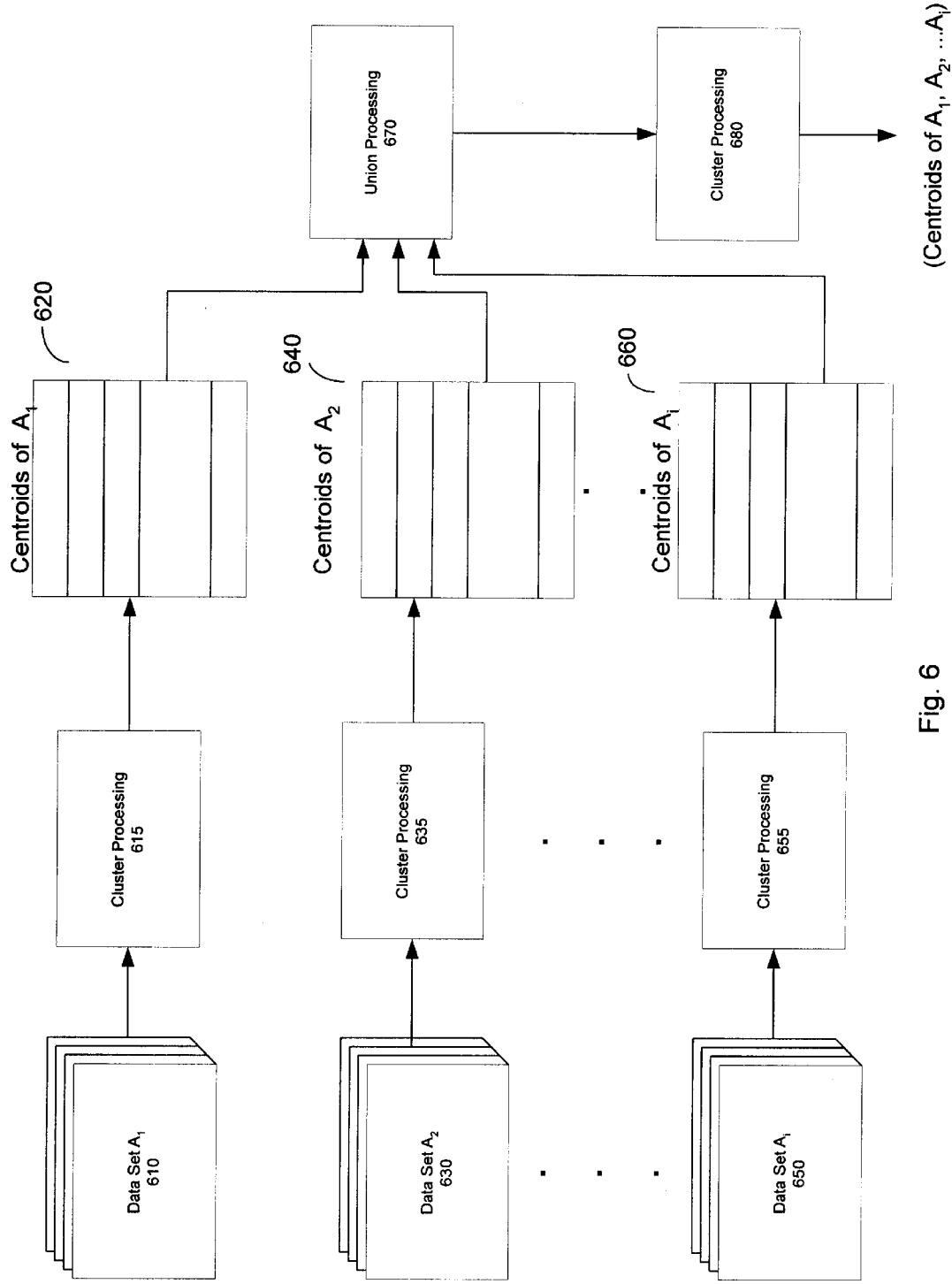
FIG. 6 is a block diagram illustrating one embodiment for an incremental clustering technique.

FIG. 6 is a block diagram illustrating one embodiment for an incremental clustering technique. A first dataset, dataset $A_1$ (block 610), is processed by the divide and conquer cluster processing (block 615) to generate centroids of $A_1$ (block 620). An additional dataset, dataset $A_2$ (block 630), is incrementally clustered (block 635) to obtain centroids (block 640). This incremental processing can be repeated arbitrarily many times as illustrated in FIG. 6. After any increment i, union processing (block 670) can be executed on the centroids of A1, the centroids of A2, . . . and the centroids of Ai (blocks 620, 640, . . . , 660) followed by cluster processing (block 680) to obtain k final centroids. As noted, the divide and conquer method of FIG. 6 is an incremental method with performance ratio four.

As discussed above, the divide and conquer technique may also be interpreted as a feature incremental technique. For s, a point over the features X for $X' \subseteq X$, define $s^{x'}$ as s restricted to the features in X'. For example, the point (1 2 4 3 7) restricted to the first and fourth features yields (1 3). For a set S of points over features X, $S^{x'}=\{s^{x'}:s \in S\}$. The feature incremental observation is restricted to additive distance measures. A distance measure is additive if the distance between two points does not decrease as more features are added. For additive distance measures, the diameter of any set of points, S, restricted to the set of features X' is at most the diameter of S restricted to the features X for $X' \subseteq X$. Also, the diameter of the best k-clustering over the features in X' is no worse than the diameter of the best k-clustering of $S^{x'}$, for $X' \subseteq X$. The divide and conquer technique described here is a feature incremental method with performance ratio 4.

Figure 7:
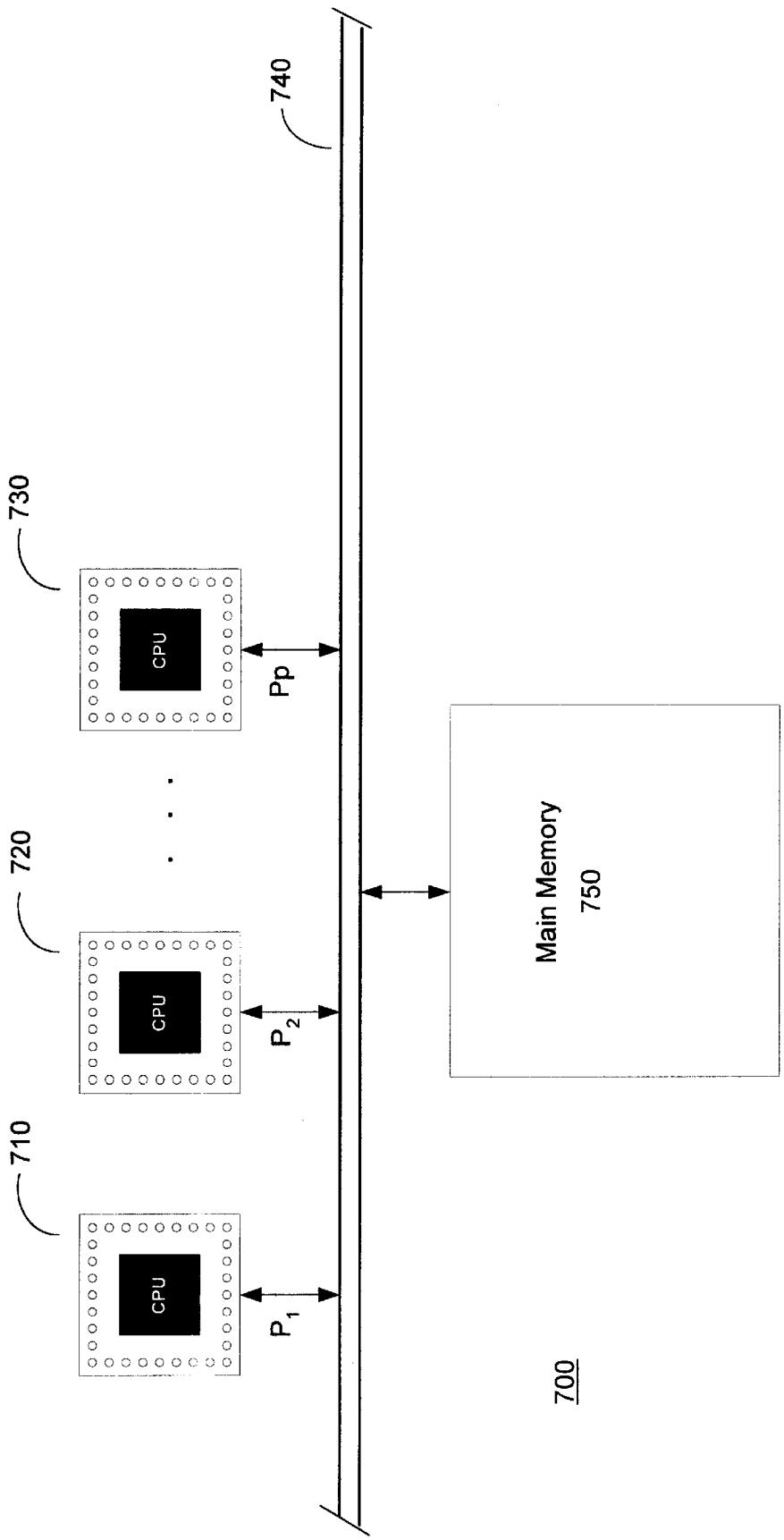
FIG. 7 is a block diagram illustrating one embodiment for implementing the divide and conquer technique in a parallel processing computer system.

FIG. 7 is a block diagram illustrating one embodiment for implementing the divide and conquer technique in a parallel processing computer system. The computer system 700 of FIG. 7 includes a plurality of central processing units ("CPUs"), labeled 710, 720 and 730. The parallel processing computer system 700 may be used to execute the divide and conquer method when the divide and conquer method is configured as a parallel method. For this embodiment, the dataset is partition the into "p" partitions. Each of the "p" partitions are processed independently (i.e., one partition for each CPU in the multi processor computer system 700). No inter-process communication is required to solve the divide step. The time complexity for the divide step is $$O\left(\frac{nk}{p}\right).$$

Once the CPUs have computed centroids for their respective subset or partition, all of the centroids are merged for processing in a single CPU. The complexity the conquer step is $O(pk^2)$ since there are pk centroids from the "p" CPUs. Thus, the parallel complexity is $$O\left(\frac{nk}{p} + pk^2\right).$$

Although the present invention has been described in terms of specific exemplary embodiments, it will be appreciated that various modifications and alterations might be made by those skilled in the art without departing from the spirit and scope of the invention.

What is claimed is:

1. A computer implemented method for clustering a set of points to identify at least $k \geq 1$ centroids, the method comprising the steps of:

receiving a set of points for clustering;

assigning a plurality of "r" subsets of the points from the set: of points into a plurality of "r" partitions, so as to uniquely assign each point of the set of points into one of the partitions;

storing the "r" subsets of points for a partition into main memory of the computer prior to cluster processing;

processing in the computer each of the "r" subsets of points to generate a plurality of partition centroids, Q, k for each of the r partitions, so as to optimize a clustering metric;

merging the partition centroids using the union operation;

storing, in main memory of the computer, the merged partition centroids; and processing the partition centroids by accessing the memory to generate a plurality of k centroids, $c_1, \ldots, c_k$.

2. The method as set forth in claim 1, wherein the steps of processing the subset of points and processing the partition centroids comprises the steps of:

selecting a point as a first centroid;

selecting a second point, farthest from the first centroid, as a second centroid;

and repeatedly choosing for the next centroid until k centroids are obtained for the point that is farthest from its closest center.

3. The method as set forth in claim 1, further comprising the steps of:

receiving each of the r partitions incrementally in time;

processing, to obtain k centroids, said r partitions when an ith increment is received; and processing (ik) centroids together with the (i−1)*k centroids from the previous (i−1) increments to obtain said k centroids.

4. The method as set forth in claim 1, further comprising the steps of:

receiving each of the r partitions incrementally in time such that the set of points in the ith increment comprises features not included in the previous (i−1) increments;

processing said r partitions to obtain k centroids when an ith increment is received; and processing (ik) centroids together with the (i−1)*k centroids from the previous (i−1) increments to obtain k centroids.

5. The method as set forth in claim 1, wherein the step of assigning a plurality of "r" subsets of points from the set of points into a plurality of "r" partitions comprises the step of assigning subsets of points so that each subset of points comprises a size sufficient for storage in the main memory.

6. The method as set forth in claim 1, wherein the step of processing the subset of points comprises the step of processing each subset of points in a separate processor of the computer.

7. A computer readable medium comprising a plurality of instructions, which when executed by a computer, causes the computer to perform the steps of:

receiving a set of points for clustering;

assigning a plurality of "r" subsets of the points from the set of points into a plurality of "r" partitions, so as to uniquely assign each point of the set of points into one of the partitions;

storing the "r" subsets of points for a partition into main memory of the computer prior to cluster processing;

processing in the computer each of the "r" subsets of points to generate a plurality of partition centroids, Q, k for each of the r partitions, so as to optimize a clustering metric;

merging the partition centroids using the union operation;

storing, in main memory of the computer, the merged partition centroids; and processing the partition centroids by accessing the memory to generate a plurality of k centroids, $c_1, \ldots, c_k$.

8. The computer readable medium as set forth in claim 7, wherein the steps of processing the subset of points and processing the partition centroids comprises the steps of:

selecting a point as a first centroid;

selecting a second point, farthest from the first centroid, as a second centroid;

and repeatedly choosing for the next centroid until k centroids are obtained for the point that is farthest from its closest center.

9. The computer readable medium as set forth in claim 7, further comprising the steps of:

receiving each of the r partitions incrementally in time;

processing, to obtain k centroids, said r partitions when an ith increment is received; and processing (ik) centroids together with the (i−1)*k centroids from the previous (i−1) increments to obtain said k centroids.

10. The computer readable medium as set forth in claim 7, further comprising the steps of:

receiving each of the r partitions incrementally in time such that the set of points in the ith increment comprises features not included in the previous (i−1) increments;

processing said r partitions to obtain k centroids when an ith increment is received; and processing (ik) centroids together with the (i−1)*k centroids from the previous (i−1) increments to obtain k centroids.

11. The computer readable medium as set forth in claim 7, wherein the step of assigning a plurality of "r" subsets of points from the set of points into a plurality of "r" partitions comprises the step of assigning subsets of points so that each subset of points comprises a size sufficient for storage in memory of the computer.

12. The computer readable medium as set forth in claim 7, wherein the step of processing the subset of points comprises the step of processing each subset of points in a separate processor of the computer.

13. A computer comprising:

an input device for receiving a set of points for clustering;

processor unit, coupled to said input device, for assigning a plurality of "r" subsets of said points from the set of points into a plurality of "r" partitions, so as to uniquely assign each point of the set of points into one of the partitions;

memory, coupled to said processor unit, for assigning subsets of points so that each subset of points comprises a size sufficient for storage in said memory;

said processor unit for processing the subset of points to generate a plurality of partition centroids, Q, k for each of said r partitions, so as to optimize a clustering metric, and for merging said partition centroids using the union operation;

the memory for storing said partition centroids; and said processor unit for processing the partition centroids by accessing the memory to generate a plurality of k centroids, $c_1, \ldots, c_k$.

14. The computer as set forth in claim 13, wherein said processor unit further for selecting a point as a first centroid, for selecting a second point, farthest from the first centroid, as a second centroid, and for repeatedly choosing for the next centroid, until k centroids are obtained, the point that is farthest from its closest center.

15. The computer as set forth in claim 13, said processor unit further for receiving each of the r partitions incrementally in time, for processing, to obtain k centroids, said r partitions when an ith increment is received, and for processing (ik) centroids together with the (i−1)*k centroids from the previous (i−1) increments to obtain said k centroids.

16. The computer as set forth in claim 13, said processor unit further for receiving each of the r partitions incrementally in time such that the set of points in the ith increment comprises features not included in the previous (i−1) increments, for processing said r partitions to obtain k centroids when an ith increment is received, and for processing (ik) centroids together with the (i−1)*k centroids from the previous (i−1) increments to obtain k centroids.

17. The computer as set forth in claim 13, said processor unit for assigning subsets of points so that each subset of points comprises a size sufficient for storage in said memory.

18. The computer as set forth in claim 13, further comprising multiple processors in said processor unit for processing each subset of points in a separate processor of the computer.

* * * * *